United States Patent [19]

Aung et al.

[11] Patent Number: 5,227,183
[45] Date of Patent: Jul. 13, 1993

[54] PROCESS FOR PREPARING DEHYDRATED AROMATIC PLANT PRODUCTS AND THE RESULTING PRODUCTS

[75] Inventors: Thein Aung, Timonium; Charles V. Fulger, Cockeysville, both of Md.

[73] Assignee: McCormick & Company, Inc., Hunt Valley, Md.

[21] Appl. No.: 735,954

[22] Filed: Jul. 25, 1991

Related U.S. Application Data

[63] Continuation-in-part of Ser. No. 630,967, Dec. 24, 1990, abandoned.

[51] Int. Cl.$^5$ .............................................. A23B 7/08
[52] U.S. Cl. .................................. 426/102; 426/310; 426/638; 426/639
[58] Field of Search ............... 426/102, 639, 640, 638, 426/302, 303, 310

[56] References Cited

U.S. PATENT DOCUMENTS

| | | | |
|---|---|---|---|
| 2,432,222 | 12/1947 | Zenzes | 426/640 |
| 3,556,814 | 1/1971 | Whitman | 426/310 |
| 3,801,714 | 4/1974 | Shipman | 426/310 |
| 4,361,589 | 11/1982 | Wauters | 426/639 |
| 4,447,640 | 5/1984 | Lewis | 426/640 |
| 4,777,055 | 10/1988 | Laiw | 426/310 |
| 4,832,969 | 5/1989 | Lioutas | 426/324 |
| 4,889,730 | 12/1989 | Roberts | 426/640 |
| 4,948,609 | 8/1990 | Nafisi-Movaghar | 426/640 |

FOREIGN PATENT DOCUMENTS

| | | | |
|---|---|---|---|
| 382654 | 7/1989 | European Pat. Off. | 426/640 |
| 53-127851 | 11/1978 | Japan | 426/303 |
| 85-00209 | 3/1986 | PCT Int'l Appl. | 426/640 |
| 946330 | 10/1961 | United Kingdom | 426/639 |

OTHER PUBLICATIONS

Osmotic Dehydration of Fruits by J. D. Ponting, et al; Oct. 1966, Food Technology pp. 125–128.

*Primary Examiner*—Carolyn Paden
*Attorney, Agent, or Firm*—Oblon, Spivak, McClelland, Maier & Neustadt

[57] ABSTRACT

The present invention provides a method of preparing and using treated fresh herb products so as to preserve the desirable qualities found in such fresh products while extending their useful shelf-life and the composition thereof. More specifically, the present invention provides a method of preparing and using shelf-stable aromatic dehydrated herbs which will upon dehydration exhibit the color, flavor, aroma and overall appearance similar to that of fresh cut herbs. Preparation of the contemplated herb compositions is carried out by treating the fresh product with an osmotic agent that in general must be able to dehydrate the food product and upon finished drying form a solid amorphous mass that coats and infuses the treated product.

29 Claims, 1 Drawing Sheet

FIG. 1

PROCESS FOR PREPARING DEHYDRATED AROMATIC PLANT PRODUCTS AND THE RESULTING PRODUCTS

RELATED APPLICATIONS

This application is a continuation-in-part of application Ser. No. 07/630,967, filed Dec. 24, 1990, which is now abandoned.

BACKGROUND OF INVENTION

Technical Field

The present invention generally relates to shelf-stable aromatic dehydrated herbs which will upon rehydration exhibit the color, flavor, aroma and overall appearance similar to that of the fresh cut plant and methods for their preparation.

BACKGROUND OF THE INVENTION

In the packaged food field, attempts have been made to package fresh, edible plant products, such as herb, fresh fruit and fresh vegetable products so that the desirable qualities of the fresh products are maintained. In particular, the art has recognized the desirability of preparing a product that would remain self-stable over extended periods thus enabling food producers, food merchants, or restaurants to stock such products, in particular, the aromatic products, for sale to consumers while reducing losses due to spoilage or deterioration. Since many of the edible plant products including herbs, fruits and vegetables valued for use in foods are, for climatic reasons, generally only available regionally and/or seasonally, the art has recognized a need for products that could be stored for extended periods o time while maintaining their fresh flavor, color and overall appearance.

In many of these products some of the properties that cause consumers to value these fresh food products are difficult to maintain for extended periods. This problem is especially acute with fresh leafy plants which contain their flavor and aroma components in discrete oil or flavor glands. Such plants are typically classified as herbs, sometimes more particularly as aromatic herbs. Accordingly, it would be desirable to preserve the color, flavor, aroma and overall natural or comminuted appearance of herbs without resorting to chemical additives, special types of packaging or packaging equipment while providing an extended shelf-life for the packaged product.

Herbs have been valued for their flavor and appearance both as a food and in food preparation for centuries. As indicated above, since fresh herbs are seasonal and have a short shelf-life, they have been preserved by many methods. In the past, the most common methods of preservation generally have involved removal of moisture (drying) or concentration of herb solids in order to reduce the possibility of microbial growth and spoilage. Other known methods for herb preservation involve salting or soaking in a brine solution, as well as solar or oven dehydration. Attempts to reduce the loss of volatile herb flavor, aroma and color during dehydration have involved alternative, more expensive methods such as freeze drying and vacuum drying.

However, all these dehydration methods result in deterioration in the quality of the fresh herb, in particular the color, flavor, aroma and overall appearance of the fresh herb is significantly impaired. Furthermore, it has long been recognized that dehydrated herbs undergo oxidation during storage resulting in further discoloration (browning) and further loss or undesirable alteration of fresh herb flavor, color and aroma. Oxidation of dehydrated herbs during storage has been somewhat curtailed through the use of chemical anti-oxidants. The addition of such chemicals is generally undesirable and may also incorporate into the food an unwanted chemical taste. Dehydration by hot air or by pickling destroys the fresh appearance and in particular the color of the herb due to herb cellular damage and enzymatic browning. This can be explained somewhat by the decomposition of the chlorophyll. Preservation by air drying at elevated temperatures also causes the loss of many of the volatile flavor components as well as the generation of off-flavors such as fish, hay and tea notes.

Another technique disclosed in the art for preserving herbs consists of pasteurization or sterilization. Like the preceding methods, such severe heat treatments are accompanied by an overall deterioration in appearance and loss of overall color and flavor.

U.K. Pat. No. 2,014,429 A to Coste generally describes several of the above mentioned prior art techniques for preserving herbs and their deficiencies.

Also, methods such as modified atmosphere packaging and freezing have been employed to maintain the fresh appearance and flavor of herbs. However, these methods are expensive and do not lend themselves to convenience in handling, long term storage or compatibility with both wet and dry food formulations. Furthermore, during thawing the color of the product may change because of enzymatic reactions, accelerated by the deterioration of the cellular structure during freezing due to the formation of ice crystals.

The use of dehydration processes which utilize principles of osmosis to reduce the moisture level in herbs and vegetables is known in the art. Generally these prior art attempts either have not resulted in a truly shelf-stable product that maintains its fresh appearance on dehydration, or the products have suffered from significant deterioration in color, flavor, or aroma. Additionally, many of the prior art solutions are unduly complex and/or are directed at very specific products. For example, U.K. Patent No. 2,014,429A describes preserving herb plants in fresh condition by adding sufficient amounts of humectant such as sodium chloride, 1,2-propylene glycol, glycerol, sucrose and sorbitol and an edible oil. These products are prepared without heating, chemical preservatives or drying. The finished product contains both the humectant and the oil which alters the flavor of the treated herbs and results in a "wet" rather than a dry product. These deficiencies limit the usefulness of this product.

U.S. Pat. No. 4,788,072 to Kawamura discloses methods for dehydrating vegetable and meat products that involve contacting the food product with a sugar solution to remove moisture. However, the disclosed process teaches unduly complex processing parameters including the use of pressure, followed by rapid decompression and subsequent injection and treatment with hot oil.

Another process is disclosed in U.K. Pat. No. 2,114,865A ('865) to Kellermann et al. which discloses preparation of dried food products which are stabilized by heating in the presence of a carrier such as salt, protein and high molecular weight carbohydrates. In one example, the '865 patent teaches the preparation of parsley by blanching with a boiling 50% solution of sucrose to produce a product containing only 15 to 20% parsley, the remaining being water and sugar. Because of the high sugar load extended drying times are required which causes matting, lumping and case hardening as well as deterioration of the flavor and appearance. Currently the product requires vacuum drying to maintain quality. Furthermore, even with vacuum drying the '865 patent is limited to a very thin drying bed due to the high load of sugar involved. Notwithstanding these precautions, the product has a candy-like texture unlike this invention where a herb-like texture is obtained U.S. Pat. No. 2,420,517 ('517) to Brander et al. discloses the dehydration of relatively large pieces (for example, disclosed are carrots ¼ inch in thickness) of vegetables such as carrots and beets. Although the '517 patent teaches the use of dehydrating agents such as corn syrup, the disclosed processes require multiple soaking treatments in increasing concentrations of syrup, a processing limitation that would result in undue complexity in large scale manufacture.

U.S. Pat. No. 4,361,589 ('589) to Walters et al. is limited to treating celery. The '589 patent teaches the preparation of dried celery pieces by soaking the fresh celery pieces in a solution containing a sugar chosen from the group consisting of lactose, glucose, a glucose syrup and derivatives thereof that contains sodium sulfite or other source of $SO_2$ and is maintained at a controlled pH in the range of 6.5 to 9. The use of sulfites is considered to be undesirable in food products. Omission of the sodium sulfite from '589 results in a loss of the celery's color.

U.S. Pat. No. 4,832,969 ('969) to Lioutas teaches dried green vegetables which have been blanched, then subsequently infused with a corn syrup and glycerine mixture and dried. The '969 patent maintains green color, however, the products lacks fresh aromatic flavor. The process of '969 is ineffective with aromatic plants since separate blanching in water prior to the infusion step destroys the aroma and flavor of such plants. Also glycerine, which is used in the infusing media, cannot protect flavor components by encapsulation because it does not form an amorphous solid. Furthermore, the presence of glycerine in the sugar containing infusing media inhibits the formation of a solid amorphous continuous coating on the herb which effectively eliminates any flavor or aroma values remaining. Also in order to maintain green color of the plant material, the '969 patent teaches using several chemical additives including emulsifiers, oxidants and various salts.

Hsieh and Albrecht in U.S. application Ser. No. 012,420, filed Feb. 9, 1987, disclose yet another technique for treating herbs to retain flavor and aroma. This technique involves treating the herbs with a first liquid bath containing anti-browning additives, removal of excess liquid and then submersion in a hot, 180–300° F., second bath comprising a polyalcohol such as glycerol. The excess glycerol is drained-off and the herb product recovered. The herb is pliable, limp and damp with free fluid glycerol in the surface and in the tissue and contains about 12% water. Furthermore, these herbs are excessively sweet and also have a very limited ambient shelf-life and need to be stored/refrigerated. The flavor and aroma components of the herbs are extracted from the herbs by the polyalcohols. Thus, this technique does not allow for the preparation of dry herb product and involves the use of polyalcohols, which are not normally found in substantial concentration in vegetable materials.

In summary, prior art endeavors in this field which have emphasized the extension of shelf-life have resorted to treatments of the fresh herb and vegetable product which include rather severe dehydration of the product and/or complex treatments of the product and in some instances the use of chemical treatments. The adverse impact of such processes on a number of characteristics of herb products is well known, and marketing demands for fresh appearing products have lessened interest in such techniques. In short, the prior art has long recognized a need for a simple method for preserving the fresh characteristics of herbs and other plants having their flavor and/or aroma characteristics contained in oil or flavor glands, sacs and the like tissues.

The present invention meets this need by providing a method for treating freshly harvested herbs so that the important qualities thereof associated with freshness such as color, natural appearance, flavor, taste, aroma, and product integrity will be retained while the shelf-life of the product will be appreciably extended as compared to the untreated product.

This invention is the result of an extensive investigation into how to maintain fresh flavor and appearance in shelf-stable dehydrated herbs. The disclosed method of dehydration involves in situ encapsulation of the flavor and color components. This process results in superior shelfstable dehydrated aromatic plant products that upon rehydration have the appearance and flavor approximating that of the freshly cut products.

SUMMARY OF THE INVENTION

An object of the present invention is to provide a method of preparing and using treated fresh aromatic plant products so as to preserve the desirable qualities found in such fresh products while extending their useful shelf-life and the compositions thereof.

A further object of the present invention is to provide a method of preparing and using shelf stable aromatic plant products which will upon rehydration exhibit the color, flavor, aroma and overall appearance similar to that of fresh cut plant products.

Another object of this invention is to provide novel, dehydrated, aromatic plant products which can be readily rehydrated to provide a product having the sensory properties of fresh cut edible plant products.

Yet another object of the present invention is to provide dehydrated herb products free from the adverse effects of enzymatic degradation including browning and loss of flavor and aromatic properties.

These and other objects of this invention which will become apparent from the following disclosure have been obtained by treating the plant material with a solution of an osmotic agent which is capable of infusion into the plant tissue and of forming an amorphous or glass-like coating over the plant tissue structure, upon by drying of the infused product. In a further embodiment of this technique, the plant material is first washed in an initial liquid bath and then subjected to the infusion process followed by drying as required.

Additional objects and advantages of the present invention are apparent from the following description having reference to the accompanying drawings.

DETAILED DESCRIPTION OF THE PREFERRED EMBODIMENTS

The term aromatic plant is used to denote those plants having specialized tissues which contains aromatic components possessing strong flavor and aroma. Such aromatic plants include herbs such as basil, parsley, oregano, dill, cilantro, sage and the like, many of which are characterized by oil sacs or glands which contain the flavor and aroma values of the plant. Aromatic plants such as herbs are prized primarily for their color, flavor and aroma. In these plants, enzymatic action cause a rapid deterioration in color and aroma.

The present process comprises infusing the aromatic plant with a humectant solution under conventional blanching conditions followed by drying to produce a product containing solid, amorphous coating on the plant tissue and, in particular, on the oil sacs or glands and the like. The humectants which can be used in this process are any osmotic agent, preferably food grade, which can be dried to form a non-crystalline or amorphous coating over the plant tissue and, in particular, over the oil sacs or glands in those herbs having same. Preferred humectants also possess high water solubility, preferably sufficient solubility to form a solution containing at least 20% by weight of osmotic agent up to the maximum solubility of osmotic agent in the solvent. From practical solubility and viscosity considerations, the content of osmotic agent does not usually exceed 70%, preferably at least 35% and more preferably from 35 to 60% by weight and most preferably 40-50 wt.%. The solvent used to form the humectant solution need not be water but can be any solvent which is easily removed by drying and does not adversely effect the flavor and aroma components. Preferably the solvent is a food grade solvent. The preferred solvent is water. The osmotic agent preferably has a low molecular weight to create high osmotic pressure sufficient to cause moisture to migrate from the plant to the humectant solution. Suitable osmotic agents include monosaccharides, disaccharides, those polyalcohols which form solids at room temperature, corn syrups with high dextrose equivalent (D.E.) and their derivative products and mixtures thereof. Preferred osmotic agents are high fructose corn syrup (HFCS), fructose, glucose, sucrose, maltose, sorbitol, maltitol and hydrogenated corn syrup. More preferred are corn syrup having a D.E. above about 62, glucose, fructose, sucrose and/or mixtures thereof. The most preferred osmotic agent is HFCS.

High molecular weight sugars such as corn syrup having a D.E. below about 62, such as commercially available corn syrup having a D.E. of about 42, do not infuse well into the leaf and require extended infusion times. Further, the higher molecular weight sugars result in a product after the infusion step which is sticky and difficult to dry.

Upon drying, sucrose normally will not form an amorphous solid but tends to crystallize. However sucrose can be used successfully to treat herbs in the present invention because herbs may contain sufficient quantities of simple sugars which combine with the sucrose to form an amorphous film around the plant tissue and the oil sacs or glands. If the infused sugar crystallizes out of the aromatic plant tissue, volatile flavor oil is easily lost during storage.

The temperature Conditions under which infusion with humectant solution occurs must be sufficient to blanch the plant. If the temperature is too low, the plant discolors and loses much of its fresh aroma and develops undesirable flavor. Conventional blanching conditions have been found suitable. Preferably, the humectant solution is maintained at a temperature high enough to prevent subsequent enzymatic action, more preferably above 180° F. The maximum temperature is not critical and is limited only by the boiling point of the humectant solution. The boiling point of the humectant solution can be increased by performing the process under pressure but no advantage is attained by such processing. It is preferred to use ambient pressures. The preferred blanching temperature is from about 180-225° F. It is necessary that the blanching occur in the humectant solution. If a separate blanching step is used in hot water or steam, the flavor and aroma of the aromatic plant are lost. It is possible to use multiple humectant solutions in sequence, however, no advantage occurs over the use of a single infusion step.

The infusion time is not critical, it need only be long enough to ensure both blanching and infusion. Excessive infusion times which cause degradation of the aromatic plant should be avoided. Times on the order of a few seconds to minutes are suitable, preferably from about 20-30 seconds to about 5 minutes. In commercial size facilities, longer infusion times may occur because of delays in material handling of large batches. Such delays do not adversely affect the product.

The drying conditions are not critical but must be sufficient to reduce the water content in the finished product sufficiently to produce the amorphous film necessary to protect the oil sacs or glands. It has been found that at water content of about 6% or less such amorphous films are formed. Excessive drying below about 2% may be detrimental to flavor and cause texture degradation. Excessively harsh drying conditions which might adversely affect the product properties should be avoided. Conventional drying techniques including air drying, air convection drying, vacuum drying, freeze drying, solar drying and the like may be employed to achieve the desired final water content. Freeze drying may be used but may result in a porous product with reduced encapsulating efficiency.

Prior to subjecting the aromatic plant to the infusion step, one may wash the plant to remove dirt, debris and other organic matter which increases the microbial content of the herb. Such washing may comprise spraying the plants with or immersing them in water, a water-detergent, or water-wetting agent mixture to remove such dirt, etc. If detergent or other wetting agent is used, the plants should be rinsed to remove residual detergent/wetting agent. Excess water from the washing step should be removed. The removal can be by simply draining, with air, vacuum, spinning or centrifuging. The preferred technique is spinning or centrifuging which quickly provides a dewatered product ready for infusion.

The washing step followed by the hot infusion and drying of the present process produces a product which has a low microbial load and may not need further sterilization. Conventional dehydrated herbs may require sterilizing for use in prepared or packaged food products. Such sterilization techniques involve conventional chemical sterilization with suitable agents such as ethylene oxide or with steam. The present process and product do not require such sterilization.

The product resulting from the processing steps has a long shelf-life, in some cases over one year at ambient temperatures in sealed packages. This product is characterized by having an amorphous coating of the osmotic agent substantially covering the plant tissue and in particular, substantially covering the oil sacs or glands. The preferred product of this invention is characterized as herb having an amorphous sugar coating substantially covering or encapsulating the plant tissue and in particular, encapsulating the oil sacs or glands. In a particularly preferred aspect, the herb product comprises at least 40% by weight of herb solids with the remainder sugar and water. In a particularly preferred embodiment the product comprises less than about 6% by weight of water, and most preferably from 2-6 wt.% water.

In the sense of the present product, encapsulation of the oil sacs or glands does not mean that the sac or gland itself is encapsulated in the amorphous film. The sacs or glands are attached at least one portion thereof to leaf tissue. Encapsulation of the sacs or glands in this invention means that the amorphous film forms a barrier which must be crossed before components from the sacs or glands can escape to the surrounding atmosphere.

It is not necessary that all the plant tissue and all the oil sacs or glands be encapsulated. It is sufficient if enough plant tissue and oil sacs and glands are encapsulated such that the desired flavor, aroma and color are maintained. Obviously the more complete the encapsulation, the more flavor, aroma and color that are retained. However, even minimal encapsulation results in improved properties. It is preferred that the encapsulation be as complete as possible where a product which compares favorably with the fresh aromatic plant is desired.

The size of the plants to be treated by the present process is not critical but does determine the time for infusion. Thus it may be desirable to reduce the plants to a size which facilitates infusion. If desired, the leaves can be separated from the plant and the whole leaf can be treated but, commercially it may be preferred to de-stem, chop, tear or shred the leaf to speed infusion.

The preferred mode of the present invention comprises the steps of: (a) washing the product with a first liquid bath; (b) removing excess surface liquid of the first bath; (c) blanching/infusing the product by immersing in a second liquid bath containing a substantial quantity of an osmotic agent; (d) removing excess surface liquid of the second bath; (e) finish drying the coated and infused product.

A more preferred aspect of the present invention comprises the steps of: (a) washing the product with a first liquid bath; (b) removing excess surface liquid of the first bath; (c) blanching/infusing the herb product in a second liquid bath containing from about 20% to about 70% of the osmotic agent solids for a time of from about 1.5 minutes to about 5 minutes; removing excess surface liquid of the second bath; (e) finish drying the coated and infused product in such a manner that the flavor is encapsulated in situ in the finished product and the product has a preferred moisture content of from about 2% to about 6%, most preferably 4 to 5%.

As noted above, the present invention relates to a method for preparing a shelf-stable, dehydrated, coated herb as well as the product of such methods which upon rehydration exhibit the color, flavor, aroma and overall appearance similar to fresh cut herbs. Generally, the process comprises the steps of preparing the raw material by washing, dewatering, treating the raw material with an osmotic agent, removing excess surface liquid and drying. All of the percentages (%) recited in this application are "by weight" unless otherwise indicated.

Figure 1:
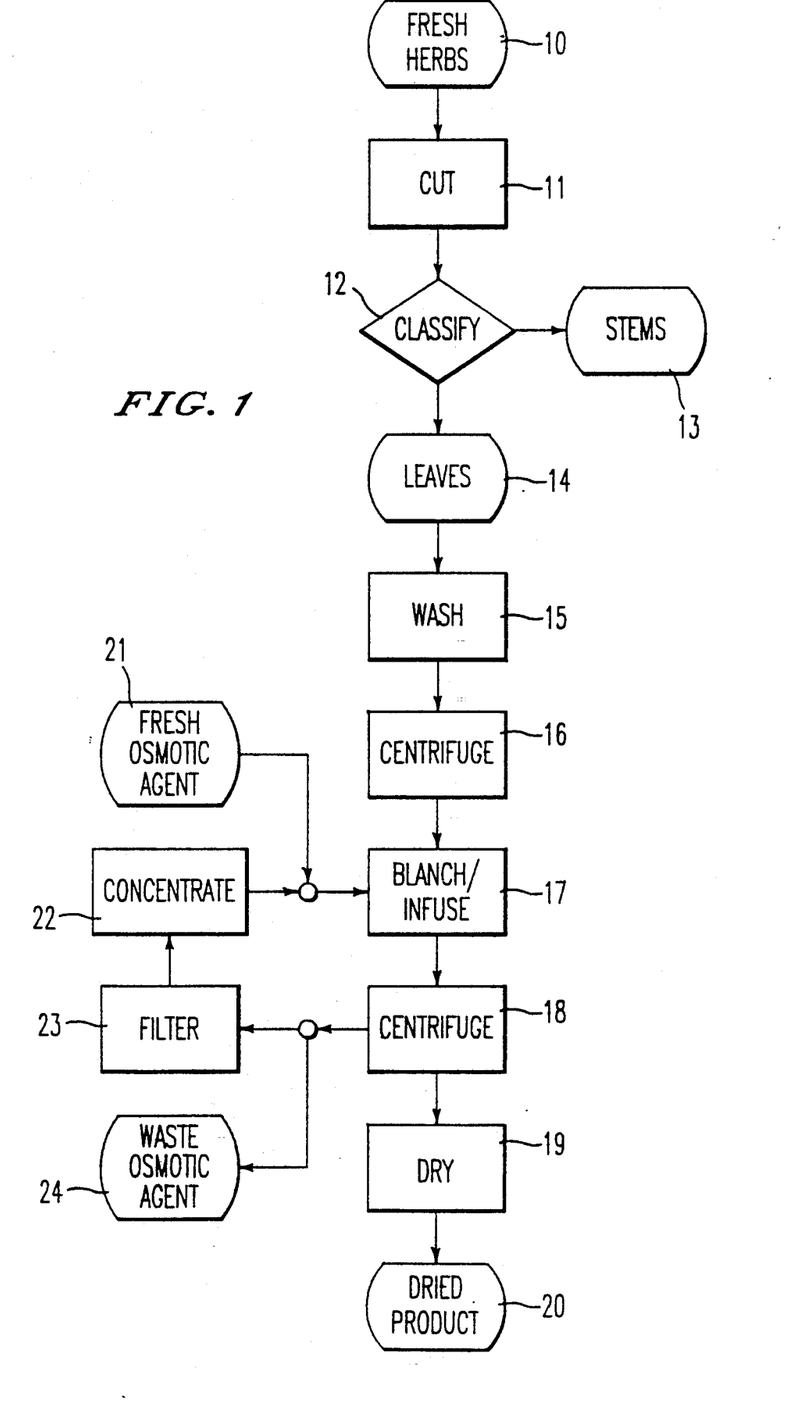
FIG. 1 is a block-type flow chart setting forth a preferred method of the present invention as applied to the treatment of herbs and for forming the product of that method.

Referring now to the drawings, wherein like numerals designate corresponding parts throughout the views, there is shown in FIG. 1 a flow chart illustrating the sequence of steps that may be employed in preferred aspects of the present invention.

Although the process can be carried out in batch form, it is preferred that the process be substantially continuous so that, as is customary in production facilities, the speed of the throughput conveyors will be set to accommodate the step in the process requiring the greatest dwell time. In handling of freshly harvested plants, it will be appreciated by those skilled in the art that for different plants, different specific treatment parameters throughout the steps of the process may be required. While FIG. 1 is self explanatory when read in conjunction with the following description, it will be noted that, in FIG. 1 several alternative packaging processes are available to a user of the process after the finish drying step 19 with regard to packaging the dried product 20. The various packaging techniques presently available can be employed and their selection will, in large part, be determined by the type of herb being treated as well as by the type of osmotic agent employed. For example, if a highly hygroscopic osmotic agent is employed for treating the herb it will be preferred to store such a product in moisture resistant packaging.

While the process for the present invention is applicable and useful with a wide variety of aromatic plant products, it is particularly applicable to preservation of herbs, as such products when freshly cut must reach the market within approximately three days and exhibit a shelf-life of only approximately seven days. It is not uncommon for many leafy herbs to lose much of their desired flavor and color in a matter of days. The present invention is also particularly applicable to preservation of certain herb products which tend to deteriorate in flavor and color upon storage, albeit less rapidly than the above-mentioned herbs.

It is an object of the present invention to enable a food processor to treat the freshly harvested products so that the treated product can be packaged conventionally and exhibit a shelf-life of from one month to over one year or longer without significant deterioration in the desirable qualities of appearance, color, flavoring capacity, aroma and overall product integrity.

Typical aromatic plants which can be treated include, but are not limited to basil, dill weed, parsley, oregano, marjoram, sage, thyme, rosemary, mint, cilantro, tarragon, chervil and genetic variations of various herbs. Examples of genetic variations would include lemon basil, cinnamon basil, purple basil and so forth. It is also contemplated that leafy herbs such as lemon grass and other grassy herbs may be treated with the process disclosed herein. A preferred sage group of herbs for use in conjunction with the present invention are basil, cilantro, dill weed, parsley, sage and oregano.

Fresh herb is harvested and preferably kept cool prior to processing to prevent enzymatic degradation. In carrying out the disclosed method of treatment, the freshly harvested herbs are first processed by separating the leaves from the stems. This is desirable because the stems and other non-leaf portions of the plant may cause problems with the drying of the product later on in the process. This separation improves the drying rate of the damp product as well as improving the quality of the finished product through more even drying. Therefore, it is desirable in a preferred method to separate out the non-leaf portions. This may be accomplished by any acceptable manner known to those skilled in the art. For example, gentle strip-cutting 11 of the whole fresh herb into pieces ranging in size from one-quarter inch to one inch may be carried out using a Urshel cutter, although it is certainly contemplated that if desirable whole leaves could be processed.

The cut herb is then conveyed to an air classifier 12 which separates the leaves from the more dense stems which are discarded 13. Again any effective means of separation may be used; one preferred system is a Key air classifier. To some extent effective leaf/stem separation is dependent upon obtaining fresh raw material (not wilted) that is free from surface water. The stem-free product 14 is then ready to be washed 15.

Again any means that are effective for removing field dirt, sand, pesticides and also reduces the microbial load may be employed. In the preferred continuous process, the stem free product is taken from the above supply located upstream of a conveyor which at its discharge end drops the vegetable product into a washer equipped with a bank of spray nozzles to agitate and wet the leaves. The nozzles are preferably fed with chilled water at approximately 40° F. from any acceptable feeding means. The leaves are conveyed via paddles through the washer where the leaves are thoroughly washed. The washing station may employ a deep tank for submerging the product for treatment instead of just spraying or a combination of spraying and submersion may be used. Preferably the product is immersed in a bath containing an ambient temperature or a slightly chilled food-grade detergent solution. The detergent solution is circulated through the bath as well as sprayed from the above-mentioned nozzles at the top of the bath at high velocity for agitation of the leaves.

The washed leaves are then conveyed on a vibrating conveyer and sprayed with ambient potable water to rinse away the detergent. Thus, the final product is cleaner than conventional air dried herb which is generally not washed during processing. Excess surface water is then removed from the leaves using any conventional means. Such means will be familiar to those skilled in the art and include a variety of methods such as vibration over a screen and/or vacuum aspiration, pressing, and by use of high power jets of air. However, a preferred method is by centrifugation 16. The leaves are loaded manually into a centrifuge basket and then the centrifuge is accelerated up to a maximum of 350 G for approximately 2 minutes. This method removes greater than 90% of the surface water with minimum damage to the herbs.

The next step in the treatment of the herb is blanching 17 of the cleaned, dried herb in a hypertonic solution which substantially coats, infuses into and osmotically dehydrates the herb product. Although the osmotic agent may be added to the herb by various well known means, FIG. 1 sets forth a recycling loop/procedure for reusing the osmotic agent. This procedure is preferred for treating the herbs. Recycling of the osmotic agent not only has economical benefits, but also may result in superior flavor and color in the final product. In particular, some of the desirable flavor and color of the fresh herb that may be removed during this step are recycled back into the product by reusing the osmotic solution. Thus, the flavor and color of the final product may be further enhanced.

By hypertonic solution, it is meant a solution that has a sufficient osmotic pressure such that moisture migrates from the herb to the bath solution. Furthermore, by coating or encapsulating, we mean an osmotic agent which upon finish drying will form a substantially continuous amorphous or glass-like film on the treated product.

The osmotic agent used must be able to infuse and dehydrate the herb being treated. Osmotic agents used in the hypertonic infusing or blanching solutions can be chosen from a group of organic materials which have high water solubility and are of sufficiently low molecular weight to create high osmotic pressure discussed previously. The most preferable agents for this purpose are HFCS, glucose, sucrose and/or mixtures thereof. To some degree the choice of the osmotic agent depends on its cost and commercial availability.

Organic materials which do not have sufficient solubility or have a large molecular weight do not facilitate osmotic dehydration and are not singly usable for this process, however they may be used as a secondary coating or component of the coating of the osmotically dehydrated herb. Examples of carbohydrates and polyalcohols that may be added as plasticizer to provide some control over texture may include starch, maltodextrin, gum Arabic and gelatin. The osmotic agent also must be able to form a solid amorphous structure upon drying to entrain or encapsulate the flavor components in a solid matrix. Therefore, osmotic agents such as glycerol and propylene glycol cannot be used for this process. Inorganic salts such as sodium chloride and calcium chloride, while having excellent osmotic dehydration properties, do not encapsulate the flavor components in a non-crystalline matrix in the dried product leading to rapid flavor loss upon dehydration. Therefore such osmotic agents cannot be used alone for this process. However, it is contemplated that osmotic agents which dry to an amorphous solid may if desired be used in combination with other osmotic agents and as a mixture may be effective herein.

Although it is possible to use a broad range of osmotic agent solids in the present invention, in order to achieve acceptable finished product quality, the infusing/blanching solution should preferably contain about 20% dissolved osmotic agent solids and may contain up to the maximum amount of osmotic agent solids which can be effectively utilized. For example, for commercially available HFCS's the range of dissolved solids is from about 20% up to about 70%.

A more preferred range is from about 35% to 60%. The most preferable solids concentration in the infusion/blanching solution is from about 40% to about 50%. When the osmotic solution is recycled, its concentration can be restored to the desired level, by adding high concentration sugar syrup or dry sugar, to the recycled solution.

Osmotic dehydration selectively removes the water from the herb while concentrating and retaining the flavor components. This is in contrast to conventional drying by heated moving air which volatilizes not only the water but much of the volatile flavor of the herb. Osmotic dehydration is directly related to the concentration of the dissolved particles, therefore increasing the concentration of the osmotic agent improves flavor retention and decreases the moisture content of the infused/blanched herb. However, viscosity of the sugar solution increases with concentration, therefore removal of excess syrup from the infused/blanched herb becomes more difficult which can result in severe stickiness and clumping problems during subsequent air drying.

The blanching temperature may vary from about 180° F. to about 225° F. A more preferred range is from about 190° F. to about 210° F. The blanching solution should be of sufficient volume and temperature to instantly bring the temperature of the fresh herb leaves above about 180° F. Plant material such as basil can brown quickly in the critical temperature range of 120° F. to about 180° F. Therefore, for example, the ratio of blanching solution to herb must be minimally about 7.5:1 at 200° F. to maintain these parameters. More preferably, the ratio of blanching solution to herb should be at least 10:1 at 200° F. The amount of time that the material is infused/blanched will vary from product to product. The present invention contemplates a time period that is effective in dehydrating and infusing the vegetable product. A preferred infusing/blanching time should be at least 1.5 minutes at 200° F. and may be up to 10 minutes or longer if lower temperatures are utilized. A more preferred range would be from about 2 minutes to about 5 minutes at 200° F. for herbs. Most preferably, the infusing/blanching time for herbs should be about 2 minutes to about 2.5 minutes as this results in inhibition of browning and maintenance of maximum flavor. This time period also results in the blanched product moisture content approaching equilibrium with the blanching solution. Blanching herbs at temperatures below 180° F. for longer time periods up to 5 minutes results in excessive flavor loss and does not make an acceptable finished product. Following blanching, excess surface blanching solution is removed from the blanched leaves by means such as gravitational draining, centrifugation, pressing or other available methods which do not damage the leaf structure. Equipment and procedures similar to those used for the previous dewatering steps could be used. The force used needs to be sufficient to remove most of surface syrup solution but not so excessive as to damage the leaves or to compact the leaves into clumps which cannot be broken up and dried. Minor clumping can be eliminated by passing the product through a mill prior to loading on the dryer. The product, partially dehydrated by osmotic agents, is finish dried by conventional dehydration which may include air drying, vacuum drying, freeze drying, and the like. One preferred method which has been found to be economical is by conventional air drying at a temperature not greater than 160° F. and an air velocity of not greater than 200 feet/minute. Drying at higher temperatures and/or air velocities greatly reduces the flavor intensity of the finished product. Most preferably the air temperature should be maintained at 150° F. with air velocity up through the product at about 100 feet per minute. The final moisture content of the dried product should be between about 2% and about 6%. The product has to be sufficiently dry so that crystallization of the coating material is prevented, or with non-crystallizing coating, that the coating material must be sufficiently continuous to prevent flavor loss. For herb products a preferred range of moisture would be from about 2% to about 6%, more preferably would be from about 4% to about 6%, and most preferably 4% to about 5%.

Herbs prepared by the method disclosed in the present invention may contain a broad range of osmotic agent concentrations. Depending on the particular herb being treated, it has been found that the osmotic agent content may vary from about 20% to about 70%, with a preferred range is from about 35% to about 65% and a most preferred range is from about 40% to about 45%.

As a result of treatment, the moisture content of the herb product will be further reduced so that the resulting water activity ($A_w$) of the preferred product, as that term is defined in U.K Pat. No. 2,014,429 A, will be on the range of from about 0.2 to about 0.3.

Thorough washing as well as blanching combine to greatly reduce the microbial load of the finished product to less than about $10^4$ per gram compared to about $10^6$ per gram for conventional air dried herbs.

Microscopic examination of the finished product confirmed that sugars have infused into the leaf tissue as well as substantially coating the leaf surface. The product retains its characteristic fresh green color and flavor for at least six months at ambient storage in a sealed container. Upon rehydration, color, flavor, aroma, and overall appearance are very similar to fresh cut herbs. No objectionable sweetness was noted. Sensory evaluation descriptive panels indicated that herbs prepared in the above manner are more similar to fresh herbs than conventional air dried herbs.

Although how the preservation method of the present invention works is not completely understood, it is believed that many of the undesirable flavor notes in herbs are due to lipid oxidation. Thus, it is believed that the present invention may be effective to some extent by limiting oxygen exposure through coating and infusion of the product (*Concentration and Drying of Foods*. D. McCarthy, Ed., pp. 31–51. Elsevier, London, 1986).

Shelf stable dehydrated herbs prepared by this method can be sized to meet the desired end use. The dried product can be used as large pieces composed mostly of whole leaves that upon rehydration will expand and be quite similar to that of fresh leaves in appearance, flavor and texture. Therefore the product's unique characteristics enable it to be used as a direct replacement for fresh herb. In contrast, conventional air dried herb is available as small pieces which upon rehydration do not expand to a large leaf size. This product can also be further milled to sizes suitable for other food applications where fresh color and flavor are of primary concern. It is further contemplated that product made by the method of the present invention could be used in a variety of food applications, including but not limited to snacks, condiments or components for use with other food items such as salads, baked goods and so forth.

The present plant products differ from those treated by prior techniques in the presence of this non-crystalline, amorphous, glass-like coating over the structure of the plant. The prior art techniques have not been concerned with whether or not the sugar crystallizes in the plant since such behavior does not affect the ability of the sugar solution to dehydrate the plant. On the contrary, in the present technique it is very important that the finished product contain an amorphous, glass-like coating. Further, the comparatively mild processing conditions used in the present technique offer the opportunity to retain more of the flavor and aroma of the plant material than is possible when more severe or rigorous conditions are used in preservation. The short blanching time employed in the present technique also serves to reduce the loss of the various flavor and aroma components from the plant. Further, the resulting product retains its texture better than techniques wherein the plant is subjected to blanching conditions for extended periods of time.

The examples which follow are intended to illustrate and explain the present invention but are not intended to be limiting in any way to the subject matter of the claims.

EXAMPLE 1

A shelf stable dehydrated basil product was prepared in accordance with the method described below. Four pounds (1816 grams) of fresh whole basil were de-stemmed by cutting off leaves with scissors. The separated leaves, 2.4 pounds (1090 grams) were rinsed with water and then most of the surface water was removed by centrifugation (Bock centrifuge, Model FP605 JToledo, OH) at 500 RPM for 1 minute.

The cleaned basil leaves which had a moisture content of approximately 85% by weight were blanched in 25 pounds of 50° Brix high fructose corn syrup (HFCS) (Isosweet 100, 42% fructose minimum, 50-52% dextrose on a dry solids basis, A.E. Stanley 15 Manufacturing Company, Decatur, IL 62525) at 200° F. (93° C.) for 2 minutes. During blanching, the leaves were gently and continuously stirred to keep the leaves totally immersed and uniformly dispersed in the blanching solution. The blanched leaves were then drained for about 1 minute and then excess surface HFCS solution was removed by centrifugation (Bock Model FP605) at 500 RPM for 2 minutes. The moisture content of the leaves after blanching and centrifugation was approximately 60% by weight. The basil leaves were then dried for 2 hours at 150° F. in a pilot scale vibrating fluidized bed dryer (Carrier, Inc., Louisville, KY) with up-flow air (flow rate about 100 feet per minute) without vibration. The final product weighed 0.4 pounds (182 grams) and had the following composition:

| | |
|---|---|
| Basil solids | 48.0% |
| Glucose | 25.0% |
| Fructose | 20.4% |
| Other Sugars | 3.4% |
| Moisture | 3.2% |

Moisture was measured by Karl Fischer titration; sugars were measured by high performance liquid chromatography and basil solids were determined by difference.

Microscopic examination of the final basil product showed that HFCS had infused into and also substantially coated the surface of the leaves, thus encapsulating the flavor oil glands of the basil leaves. Fresh basil aroma was released only upon rehydration. The product was stable for at least six months at room temperature in a sealed container.

Upon rehydration, this product exhibited the characteristic green color, aroma and overall natural, comminuted appearance approximating that of freshly cut basil. Conventional air dried basil prepared by drying the cleaned basil leaves from the same lot of material used in the above process but without blanching in HFCS was brown in color, and upon rehydration had tea and hay-like off-flavors as well as a woody texture. Samples were prepared for sensory evaluation by blending either the processed herb, fresh herb or conventional air dried herb with 0.3% gum base in ambient temperature spring water. The sensory evaluation descriptive panel indicated that basil prepared by the above blanching procedure was stronger in minty character, green flavor and total flavor strength than conventional air dried basil.

EXAMPLE 2

A shelf stable dehydrated basil with fresh-like quality characteristics was prepared in accordance with the method described below.

Fresh whole basil was harvested and kept refrigerated for not more than 2 days before processing. Approximately 100 pounds (45 kilograms) whole dry basil was fed lengthwise into a rotating half inch circular knife (Urschel Model J cutter, Valparaiso, IN 46384, crosscut knife and stripper plate were removed). The basil leaves were thus stripped from the stems as whole leaves with minimal damage to the leaves. After cutting, the leaves were separated from the stems by air classification using a KEY 2X Air Cleaner (KEY Technology, Inc., Walla Walla, WA). The basil leaves were conveyed to a continuous washer where the leaves were washed in ambient temperature water containing 2500 ppm Vega-Kleen detergent (Klenzade, Division of Ecolab, Inc., St. Paul, MN) to remove field dirt and reduce the microbial load.

The washed leaves were transferred to a vibrating rinser to remove residual detergent. The remaining surface water was removed by centrifugation (Bock Model FP910 centrifuge) at a maximum speed of 900 RPM for 2 minutes.

The cleaned and dewatered basil leaves (40 pounds, 18 kilograms) were submerged in a steam jacketed kettle containing 130 gallons (492 liters) of 40° Brix HFCS blanching solution at 200° F. (93° C.). Jets of recirculating blanching solution dispersed the basil leaves in the kettle. The leaves were blanched for 2 minutes and then the centrifuge basket containing the blanched leaves was lifted out of the kettle and allowed to drain for about 1 minute. Remaining excess surface HFCS was removed by centrifugation in a second centrifuge (Bock Model FP910) at a maximum speed of 500 RPM for 2 minutes. Blanched basil leaves were passed through a mill (Fitzmill Model D6, The W.J. Fitzpatrick Co., Chicago, IL) to loosen any clumps and then spread on a table dryer to a final bed depth of about 4 inches. Up-flow air (about 150° F.) was forced through the bed at approximately 100 feet per minute for about 2 hours to dry the product to a moisture content of about 4%. Product was stirred manually about every half hour to disintegrate any lumps for uniform drying. The dried product was then cooled by forcing ambient air through the bed before unloading from the dryer. The finished product was further sized to suit application needs. The finished product weighed about 7 pounds (about 3 Kg) and was composed of 42% to 48% HFCS, 48% to 54% Basil solids and a final moisture content of 4%.

The finished product was green in color, and upon rehydration the leaves exhibited the characteristic aroma and comminuted appearance of freshly cut basil. Conventional air dried basil prepared by drying the cleaned basil leaves from the same lot of material used in the above process but without blanching with an osmotic agent (HFCS) was brown in color, and upon rehydration had tea- and hay-like off-flavors as well as a woody texture.

EXAMPLE 3

A shelf stable dehydrated parsley was prepared in accordance with the method described in Example 2. The finished product was composed of:

| | |
|---|---|
| Parsley solids | 50.1% |
| Glucose | 24.4% |
| Fructose | 20.0% |
| Other Sugars | 3.4% |
| Moisture | 2.1% |

A sensory evaluation descriptive panel compared parsley prepared by the above process to conventionally prepared air dried parsley and determined that parsley prepared by the above process to be similar in quality to fresh parsley and greatly superior to conventional air dried parsley.

EXAMPLE 4

A shelf stable dehydrated dill weed was prepared in accordance with the method described in Example 1 with the following modification. Due to the small size of dill weed leaves, they could not be completely separated from the stems. Therefore, only large stems were removed and the leaves were processed still attached to the small stems. Stems were removed from the finished product by passing the product through a screen. The finished product was composed of:

| | |
|---|---|
| Dill Weed | 66.4% |
| Glucose | 15.2% |
| Fructose | 13.3% |
| Other Sugars | 2.2% |
| Moisture | 2.9% |
| $A_w$ | 0.232 |

A sensory evaluation descriptive panel indicated that dill weed prepared by the above procedure was closer to fresh dill weed flavor and had less tea and hay off-flavors than conventional air dried dill weed.

EXAMPLE 5

A shelf stable dehydrated cilantro was prepared in accordance with the method described in Example 2. The finished product had a composition of:

| | |
|---|---|
| Cilantro solids | 52.3% |
| Glucose | 22.7% |
| Fructose | 18.0% |
| Other Sugars | 3.1% |
| Moisture | 3.9% |
| $A_w$ | 0.232 |

A sensory evaluation descriptive panel indicated that cilantro prepared by the above procedure had more fresh flavor and less hay off-notes than conventional air dried cilantro.

EXAMPLE 6

A shelf stable dehydrated sage was prepared in accordance with the method described in Example 1. The finished product had a composition of:

| | |
|---|---|
| Sage | 51.5% |
| Glucose | 23.4% |
| Fructose | 19.2% |
| Other Sugars | 3.2% |
| Moisture | 2.7% |

A sensory evaluation descriptive panel indicated that sage prepared by the above procedure was considerably higher in total quality than either fresh sage or conventional air dried sage.

EXAMPLE 7

A shelf stable dehydrated oregano was prepared in accordance with the method described in Example 1.

The product was prepared using two different blanching conditions: blanching at 165° F. (74° C.) for 5 minutes or blanching at 200° F. (93° C.) for 2 minutes. Oregano produced using the lower temperature blanch was darker in color and had flavor more typical of conventional air dried oregano (less minty and more hay-like) as evaluated by sensory analysis. Oregano produced using the higher temperature had a more fresh green color and the flavor was more similar to fresh oregano.

EXAMPLE 8

Dehydrated basil was prepared by the method described below. Five pounds (2.3 kilograms) of fresh basil was destemmed with scissors and the leaves were divided into 100 gram lots. Each lot was washed with ambient water and the surface water was removed using a kitchen salad spinner. The basil was blanched at 200° F. (93° C.) for 2 minutes in 1000 ml of one of the following blanching solutions:

A. 40% Dextrose (Del #11, Stanley Mfg. Co., Decatur, IL)

B. 40% Sucrose (Domino Sugar, Baltimore, MD) 20

C. 40% Fructose (Krystar 300, Stanley Mfg. Co.)

D. 40% Lactose (Sigma Chemical Co., St. Louis, MO)

E. 40% Maltitol (TCI America, Portland OR)

F. 40% Maltose (Maltose monohydrate, Aldrich Chemical Co., Milwaukee, WI)

G. 20% High Fructose Corn Syrup (Isosweet 100, Stanley Mfg. Co.)

H. 40% High Fructose Corn Syrup (Isosweet 100, Stanley Mfg. Co.)

The blanched leaves were drained in a strainer for 1 minute and then centrifuged using a kitchen salad spinner for 1 minute to remove excess surface blanching solution. The blanched leaves were then dried at 145° F. (63° C.) for about 1.5 hours in a convection oven (Farberware Turbo-Oven Model 460/5, Kidde Industries, Inc., Bronx, NY) with the door of the oven slightly ajar. The finished product weighed about 20 grams with a moisture content of about 4%. All eight samples were evaluated by the sensory evaluation descriptive panel. All samples were determined to have comparable flavor and appearance to the basil sample prepared with 40% high fructose corn syrup.

EXAMPLE 9

Shelf stable dehydrated oregano was prepared according to the method described in Example 8. All samples using the different blanching solutions listed in Example 8 were judged to have comparable flavor and appearance to the oregano sample prepared with 40% high fructose corn syrup.

What is claimed as new and is desired to be secured by Letters Patent of the United States Is:

1. A method of treating fresh aromatic plants comprising the steps of:
    immersing the product in a liquid bath at a temperature of at least about 180° F. containing an osmotic agent which is capable of infusing into the plant tissue and forming an amorphous solid upon drying;
    removing excess surface osmotic liquid;
    finish drying the coated and infused product to form a dried product having an amorphous coating on the surface and throughout the plant tissue.

2. The method of claim 1, wherein said aromatic plant is washed prior to immersion in the liquid bath containing the osmotic agent.

3. The method of claim 2 wherein prior to washing the fresh plant, leaves of the herbs are separated from the stems and other non-leafy portions.

4. The method of claim 1 wherein the osmotic agent is selected from a group consisting of monosaccharides, disaccharides, corn syrups of a dextrose equivalent of 62 or higher and their derivative products and mixtures thereof which form solid amorphous material at ambient temperature.

5. The method of claim 1 wherein the osmotic agent is selected from a group consisting of HFCS, fructose, glucose, sucrose, maltose, sorbitol, maltitol, low molecular weight hydrogenated corn syrup and mixtures thereof.

6. The method of claim 1 wherein the liquid bath contains from about 20% up to the maximum solubility of the osmotic agent which can effectively infuse and dehydrate the aromatic plant.

7. The method of claim 6 wherein the liquid bath contains less than about 70% of the osmotic agent.

8. The method of claim 1 wherein the liquid bath is maintained at a blanching/infusing temperature of from about 180° F. to about 225° F.

9. The method of claim 1 wherein the liquid bath is maintained at a blanching/infusing temperature of from about 190° F. to about 210° F.

10. The method of claim 1 wherein the aromatic plant is immersed in the liquid bath for a time of from about 20-30 seconds to about 5 minutes.

11. The method of claim 1 wherein the aromatic plant product has a final moisture content of from about 2% to about 6%, an osmotic agent content of from about 20% to about 65%, and a water activity ($A_W$) of from about 0.2 to about 0.5.

12. The method of claim 1 wherein the aromatic plant product is characterized by a final moisture content of from about 4% to about 5%, an osmotic agent content of from about 40% to about 60%, a water activity ($A_W$) of from about 0.2 to about 0.3 and is further characterized by an amorphous coating substantially covering and infusing the plant tissue.

13. The method of claim 1 wherein the aromatic plant is a herb.

14. The method of claim 13 wherein the herb is selected from the group consisting of basil, dill weed, parsley, oregano, marjoram, sage, thyme, rosemary, mint, cilantro, tarragon, chervil and genetic variations thereof.

15. The method of claim 14 wherein the herb products treated are selected from a group consisting of basil, cilantro, dill weed, parsley, sage, oregano and genetic variations thereof.

16. A method of treating fresh herbs and the like, comprising the steps of:
    washing the product;
    removing excess surface liquid;
    blanching/infusing the product at a temperature sufficient to blanch the herb by immersing in a liquid bath containing an osmotic agent capable of infusing into the herb and also forming an amorphous coating upon drying;
    removing excess surface liquid of the bath;
    finish drying the coated and infused product in such a manner that the flavor is encapsulated in situ in the finished product.

17. The method of claim 16 wherein prior to washing the product, the leaves of the herbs are separated from the stems and other non-leafy portions.

18. The method of claim 16 wherein the osmotic agent is selected from the group consisting of monosaccharides, disaccharides, corn syrups of a dextrose equivalent of 62 or above and their derivative products and mixtures thereof which form solid amorphous material at ambient temperatures.

19. The method of claim 16 wherein the osmotic agent is selected from the group consisting of HFCS, fructose, glucose, sucrose, maltose, sorbitol, maltitol, low molecular weight, hydrogenated corn syrup and mixtures thereof.

20. The method of claim 16 wherein the liquid bath contains from about 20% up to about 70% of the osmotic agent.

21. The method of claim 16 wherein the liquid bath containing from about 35% up to about 65% of the osmotic agent solids.

22. The method of claim 16 wherein the liquid bath is maintained at a blanching temperature of from about 180° F. to about 225° F. and the herbs are subjected to blanching for a time of from about 20 seconds to about 5 minutes.

23. The method of claim 16 wherein the liquid bath is maintained at a blanching temperature of about 200° F., the ratio of blanching solution to herb is at least about 7.5:1 and the herbs are subjected to blanching for a time of from about 2 minutes to about 5 minutes.

24. A method of claim 16 wherein the herb product is characterized by a final moisture content of from about 2% to about 6%, an osmotic agent content of from about 20% to about 65%, a water activity ($A_W$) of from about 0.2 to about 0.3 and infusion of the osmotic agent into the leaf tissue as well as coating the leaf tissue with the osmotic agent.

25. A dehydrated shelf-stable herb product which is characterized upon rehydration by having color, flavor, aroma, and overall appearance very similar to that of the freshly cut herb having a moisture content of 6% or less, and an amorphous coating covering and infusing the herb tissue.

26. The self-stable, dehydrated herb product of claim 25 wherein the herb products are selected from a group consisting of basil, dill weed, parsley, oregano, marjoram, sage, thyme, rosemary, mint, cilantro, tarragon, chervil and genetic variations thereof.

27. The self-stable, dehydrated herb product of claim 25 wherein the herb products are selected from a group consisting of basil, cilantro, dill weed, parsley, sage and oregano.

28. The self-stable, dehydrated herb product of claim 25 wherein the sugar is selected from a group consisting of monosaccharides, disaccharides, corn syrups with dextrose equivalent of about 62 or above and their derivative products and mixtures thereof.

29. The self-stable, dehydrated herb product of claim 28 wherein the herb product has a final moisture content of from about 2% to about 6%, sugar content of from about 20% to about 65%, and a water activity ($A_w$) of from about 0.2 to about 0.3.

* * * * *